Dec. 8, 1970  KENZI KATO  3,546,554
PHASE DEPENDENT MOTOR SPEED CONTROL
Filed April 25, 1967  2 Sheets-Sheet 1

INVENTOR.
KENZI KATO
BY
Linton and Linton
ATTORNEYS

Dec. 8, 1970 KENZI KATO 3,546,554
PHASE DEPENDENT MOTOR SPEED CONTROL
Filed April 25, 1967
2 Sheets-Sheet 2
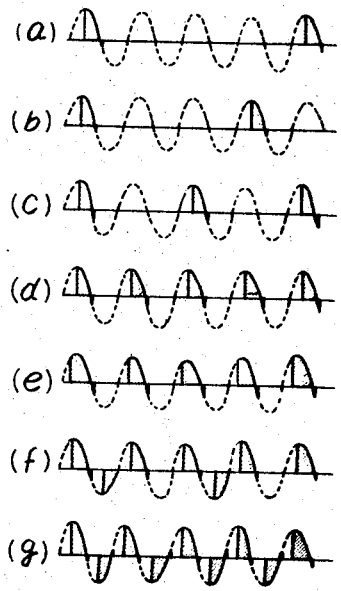
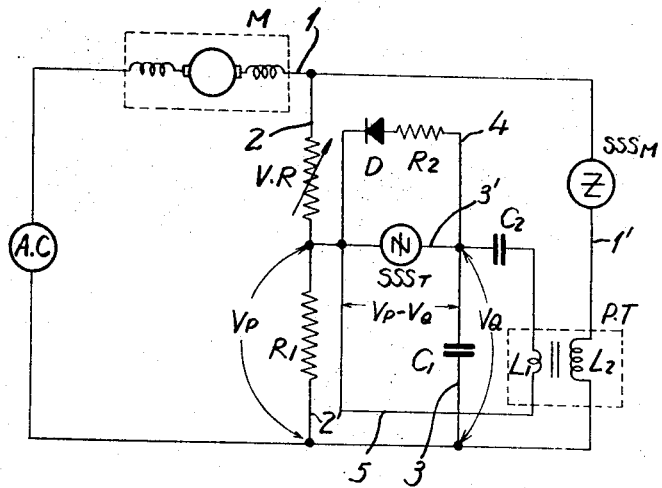
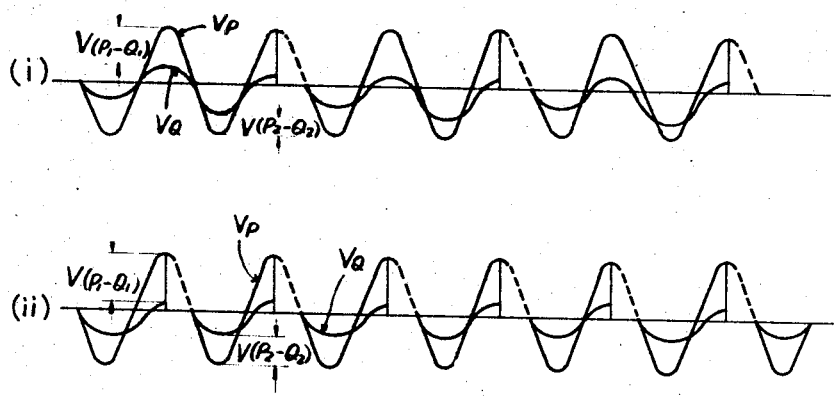
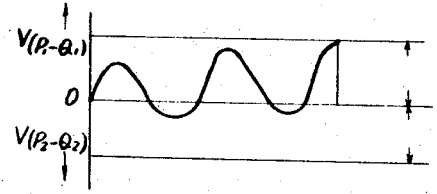
INVENTOR.
KENZI KATO
BY
Linton and Linton
ATTORNEYS

United States Patent Office 3,546,554
Patented Dec. 8, 1970

3,546,554
PHASE DEPENDENT MOTOR SPEED CONTROL
Kenzi Kato, Tokyo, Japan, assignor to Janome Sewing Machine Co., Ltd., Chuo-ku, Tokyo, Japan, a corporation of Japan
Filed Apr. 25, 1967, Ser. No. 633,589
Claims priority, application Japan, Dec. 29, 1966, 42/85,706
Int. Cl. H02p 7/62
U.S. Cl. 318—341         5 Claims

ABSTRACT OF THE DISCLOSURE

The present system is for controlling the speed of a motor and a circuit therefor employing symmetrical semiconductor switching elements, and is more particularly directed to a circuit for providing especially a spaced wave control of the input terminal voltage of the motor at a low speed drive thereof so as to heighten the low speed control of a load having a torque characteristic such as a sewing machine. A series circuit is constituted by an alternating power source, a motor, a symmetrical semiconductor switching element for a main circuit and the secondary winding of a pulse transformer. A variable resistor and a first resistor are connected in parallel to the series circuit of the alternating power source and the motor, and a series circuit of a symmetrical semiconductor switching element for ignition and a first condenser is connected in parallel to the first resistor and a series circuit of a second condenser and the primary winding of a pulse transformer and a series circuit of a diode and a second resistor are respectively connected in parallel to the semiconductor switching element for ignition, so that the first condenser is charged with a direct current through the series circuit of the diode and the second resistor, and the alternating voltage applied to the semiconductor switching element for ignition through the first resistor, the diode, the second resistor and the first condenser is made positively and negatively asymmetrical, whereby the alternating voltage to the input terminal of the motor is subjected to a spaced wave control as well as to a half wave phase control and a full wave phase control.

DETAILED EXPLANATION OF INVENTION

The present invention relates to a speed control system using a symmetrical semiconductor openable and closable element and a circuit therefor. The object of this invention is to provide a circuit which raises low control ability in speed control of load having torque characteristic which is recognized to increase wavily or intermittently because of a working mechanism, such as a sewing machine to which is applied torque wavily or intermittently, for instance working the mechanism having a reciprocative movement, and working condition of said mechanism, etc., and especially makes spacing wave control of input terminal voltage of motor at the time of the low speed of the mechanism.

Generally there are a variety of machinery and instruments to which is intermittently applied a torque beacuse of their construction condition and working condition of their mechanism. For instance in reciprocating mechanism in which are repeated standstill and movement, a relatively high torque is generated when the mechanism shifts from standstill to movement. Even relating to mechanisms making rotary movement, things are similar to reciprocating mechanism. Further as to working condition, the load is very often applied intermittently by cutting, friction, etc. To explain a typical example, torque of a sewing machine in low speed revolution can generally be represented as in FIG. 1. FIG. 1*a* shows torque of a straight stitching sewing machine. Portion *a* shows the increase of torque required by working condition at each revolution when needle goes through cloth. FIG. 1*b* shows the torque generated in zigzag stitching made by main cam. In this case the increase of torque required at each revolution, when needle goes through cloth, also shows so-called pitch *a*. Further in front of this pitch *a* appears another pitch *b* every two revolutions. Pitch *b* shows torque required for moving needle to one side of amplitude by working mechanism such as cam. Especially the appearance of this torque every two revolutions is caused by the action of returning the needle to its original position made by reaction of a spring, requiring little torque. So torque of low speed revolution of sewing machine abruptly increases in a certain phase in either straight stitching or zigzag stitching. The quantity of torque depends on hardness or thickness of cloth, number of sheets or shape of zigzag cam, etc. and moreover incessantly varies by time sequence as a nature of sewing machine stitching.

The fundamental object of the present invention is to raise control ability of the load especially at the time of low speed, when the increase of torque is intermittently recognized. In controlling speed of a sewing machine having torque characteristic as exemplified, hitherto used speed control system of sewing machine motor can hardly serve for enhancing low speed property of sewing machine, stability of action at the time of said low speed or effective starting ability at low speed. The reason for this difficulty of the prior art is as follows. As well known, in prior speed control of a general sewing machine motor, namely in single phase series commutator motors, input terminal voltage of motor relays upon amplitude control of AC voltage as shown in FIG. 2(A), bilateral wave phase control made by symmetrical semiconductor openable and closable element as shown in FIG. 2(B), or half wave control conducted by asymmetrical semiconductor commutating element. However torques generated in the motor by these systems are respectively as shown in FIG. 2(A'), (B'), (C'). At frequency of 50 c/s of AC power source in case of amplitude control, number of pulsation wave of torque generated is 100/sec., in case of bilateral wave phase control, number of pulsation is also 100/sec. with a small difference of wave shape, and in case of half wave phase control, number of pulsation is 50/sec. These numbers of pulsation waves are respectively constant independently from quantity of torque generated. Supposing that the period of said abrupt increase of torque of the sewing machine is 2/sec. (120 r.p.m. within the range of low speed for revolutions of the sewing machine), the relations of period with said torque produced are as shown in FIG. 2(A''), (B''), (C''). This shows that in zones of less torque of sewing machine, torque much higher than required is produced. Owing to this, for instance, the starting revolution obtained just after overcoming a very high static torque is high and no satisfactorily low speed revolution can be obtained under influence of this static torque. Especially at the time of such low speed, the sewing machine stops immediately when the maximum value of the sewing machine torque exceeds torque generated in motor even a little. Further in medium and high speed conditions inertia torque generated by a flywheel or other working parts of the sewing machine considerably increases so that the machine does not stop despite some increase of machine torque, thereby making a substantially stabilized revolution. Hence it is apparent that operation of the sewing machine can be advantageously improved theoretically by reacting making the variation of machine torque reset on control circuit by some means, so as to convert the machine torque into input terminal voltage of the motor in response to variations of torque. In case so called feedback control system is adopted in this way of thinking, if it is intended to make this system fully effective especially at the time of low speed, the action of the control comes to abruptly vary, thereby making an extremely fluctuating revolution just as in knocking phenomenon. This problem can hardly be solved technically and economically. In order to eliminate disadvantages of prior arts, the present invention proposes a spacing wave control of terminal control of input terminal voltage of the motor in low speed. Namely the present invention intends to make the relation between the sewing machine torque and torque generated by the motor at the time of low speed as above stated, as shown in FIG. 3. In FIG. 3, torque $t$ generated of one wave of the motor is larger than anticipated maximum machine torque $T$ caused by variation of operation. Here speed control is effected by changing repeated frequency without changing amplitude of one wave of torque generated of the motor. This system enables to obtain starting revolution and low speed revolution, both extremely low in sewing machine. Moreover it prevents the sewing machine from stopping so as to enable a stabilized operation even when machine torque somewhat varys.

Another object of the present invention is to provide a system for speed control of a motor and a circuit therefor, much improving the field of use with respect to above-stated sewing machine which often requires low speed operation for its use. For instance in case of stitching corner portion of cloth or curved stitching, it is required to sew with largely turning cloth. In such cases if the machine is operated at high speed, the formation of appropriate stitch self-evidently becomes impossible or very hard. Especially in this kind of sewing machine, in case when free creative embroidery stitching is made by operator's manipulation of cloth without using any pattern cam, the stitching depends on appropriate manipulation of cloth in all steps so that low speed operation is required in all stitching works. However as publicly known with prior motor sewing machine, it is impossible or very hard to make such low speed operation. Hence the embroidery stitching is ordinarily conducted by pedal sewing machine. However, as well known by those with some experience, the low speed operation is very hard for pedal sewing machine. For pedal operation of such a sewing machine at such a low speed such as 200 r.p.m. or below, a close attention must be concentrated to pedalling so that the operator's attention directed to embroidery stiching lessens. Moreover at such a low speed, every little drop of speed causes a stop of the machine. For starting stopped sewing machine again, the operator has to take his hand off embroidery stitching at every stop, to give torque to the flywheel or other members of sewing machine for starting. Accordingly embroidery stitching made under this condition inevitably becomes extremely slow, moreover resulting to very awkward workmanship. So those who intend embroidery stitching are required to attend special course or seminar for a fairly long period for particular study and training. This is quite unaccessible for common housekeepers. The present invention has remarkably improved the low speed operation ability of above mechanism and made a big progress in starting ability, workability and stability of such sewing machine at the time of low speed. This enables to realize embroidery stitching and other low speed work by sewing machine very simply and easily, thereby considerably enhancing application value and field of use, dispensing with technique for embroidery stitching, releasing operators from painful operation of sewing machine, opening door of smooth embroidery stitching to common housekeepers too, and enabling operator to concentrate attentiveness on stitching portion for satisfactory embroidery stitching and others.

Another object of the present invention is to provide spacing wave control capable of bringing out the above characteristics and perform hitherto used phase control with respect to this kind of motor. It is needless to say that phase control hitherto used for driving motor is preferable for high speed drive of the load. Especially in prior sewing machines, high speed operation is essential for securing its high efficiency of work in general operation. The present invention improves the workability at the time of the low speed drive of load and also enables phase control with one and the same construction, thereby providing fully high speed workability. Namely the present invention can advantageously improve the workability of the load in the whole range from low speed to high speed.

Another object of the present invention is to accomplish the above object with a relatively simple and easy construction. Namely the present invention accomplishes above spacing control and phase control with one and the same construction. This in itself fully shows the simpleness of the construction. Moreover for controlling the input terminal voltage of the motor, the present invention adopts a symmetrical semiconductor element. This point also much simplifies the construction. Such an economical electric circuit controls the alternate current as shown in the explanatory views of the control process of FIG. 4(a)-(g). In FIG. 4 dotted line shows wave shape of alternate current power source voltage and solid line portion shows that it is supplied by motor. As illustrated, in the range (a)-(d), respective voltage shape waves are not subjected to phase control, but space between two waves is under control (So called spacing wave control). In the range (d)-(e) the respective voltage wave shapes are subjected to phase control. In the range (e)-(g) the waves are subjected to phase control from half to full and after (g) is performed full wave phase control. The embodiment of such a variety of controls highly improves the workability of load.

Another object of the present invention is to reduce power consumption. The present invention obtains torque generated of a motor corresponding to the condition of generation of torque in sewing machine and other load especially at the time of low speed operation. Moreover as aforementioned in zone of less marchine torque, the present invention reduces the generation of unnecessarily high torque of a motor to the possible minimum. The present invention which practices such a way of driving a motor can evidently curtail consumption of power.

Many other more excellent characteristics and concrete construction of the present invention can be more appropriately understood with reference to the explanation of the following embodiments. Namely in the appended drawings:

FIG. 4 is an explanatory view of control process of voltage according to the present invention.

FIG. 5 is a circuit diagram of the present invention.

FIG. 6 and FIG. 7 are explanatory views of action of embodiment of the present invention.

Figure 1:
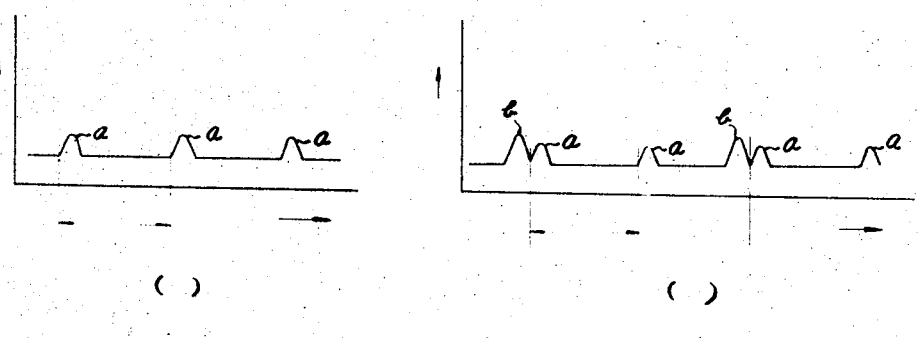
FIG. 1 is a diagram of torque at the time of low speed revolution of sewing machine.
Figure 2:
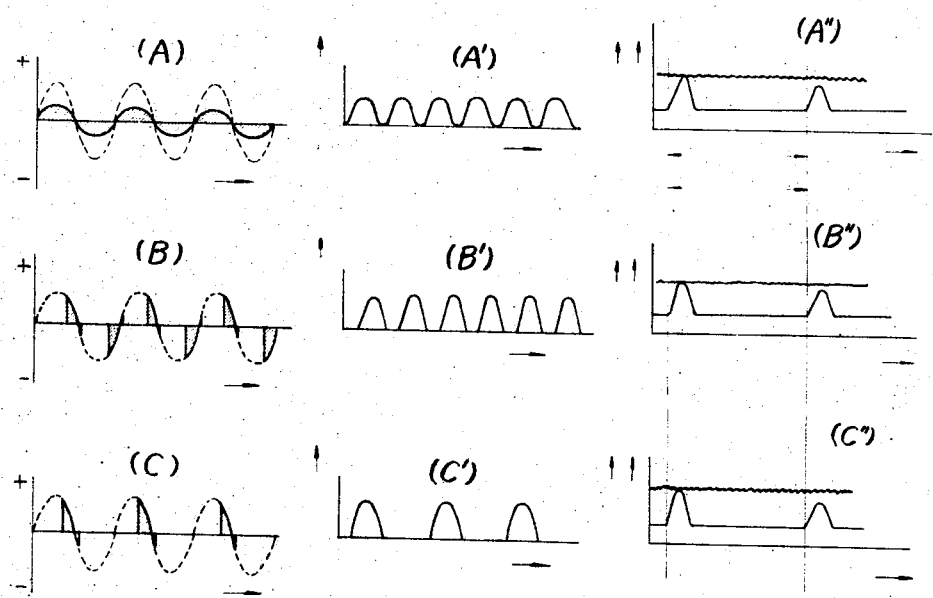
FIG. 2 is a view showing relation among voltage wave shapes and torque generated of a motor and torque of a sewing machine according to prior control system.
Figure 3:
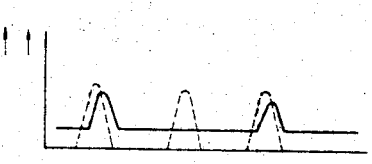
FIG. 3 is a view showing relation between torque generated of a motor and torque of a sewing machine according to the control system of the present invention.

Further explanation will be given hereinafter to the present invention on the basis of above drawings.

The circuit of embodiment of the present invention, displaying above-stated performance is as shown in FIG. 5. In said figure, AC denotes alternate current source; M denotes single phase series commutator motor; $SSS_M$ denotes symmetrical semiconductor openable and closable element for main circuit; $L_2$ denotes secondary coil of pulse trans. These members constitute a series closed main circuit (1) in the order as illustrated. With the series circuit 1' composed of secondary coil $L_2$ of pulse transmitter P.T. and portion of element $SSS_M$ for main circuit is connected in parallel the series voltage dividing circuit 2 of variable resistor V.R. and resistor $R_1$; and with the portion 2 having resistor $R_1$ is further connected in parallel the series ignition circuit 3 of symmetrical semiconductor openable and closable element $SSS_T$ for ignition is connected in parallel the series diode circuit 4 of diode D and resistor R. Further, in connecting the above secondary coil $L_2$ of pulse transmitter, said secondary coil $L_2$ is connected in series with element $SSS_M$ for main circuit, because the circuit of the present invention adopts a publicly known series ignition method. But the parallel ignition method may be adopted. In the latter case one has only to connect a series circuit of the secondary coil $L_2$ and another condenser in parallel with element $SSS_M$ for main circuit.

An explanation will be given on the action of the circuit of the present invention of above construction. The continuity of element $SSS_M$ for the main circuit is in itself made by a known method. Namely the electric charge stored in condenser $C_2$ ,s abruptly discharged by breakover of element $SSS_T$ for ignition and causes current to flow into primary coil $L_1$ of pulse trans P.T. to generate signal pulse in secondary coil $L_2$. This signal pulse feeds element $SSS_M$ for main circuit. In this case the spacing wave control by half wave as shown in FIG. 4(a)–(d), characterizing this invention is made as follows. The basic factor for this control resides in that condenser $C_1$ is charged in the form of direct current over diode D of diode circuit 4 and resister $R_2$. Namely as apparently seen from circuit diagram, terminal current of element $SSS_T$ for ignition at the time of discontinuity of element $SSS_M$ for main circuit can be obtained by adjusting the power source voltage with resister V.R. Said terminal voltage of element $SSS_T$ is the potential difference between terminal voltage $V_P$ of resister $R_1$ and terminal voltage $V_Q$ of condenser $C_1$, namely $V_P - V_Q$, wherein $V_P$ is power source voltage reduced by resistance value of resister V.R. If resistance value of resister $R_2$ connected in series with diode D is selected so as to be smaller than impedance of condenser $C_2$ and that alternate current applied to condenser $C_1$ of ignition circuit 3 is made positively and negatively asymmetrical, said condenser $C_1$ is charged on the polarity side of larger amplitude of voltage. FIG. 6 is a wave shape view representing the relation of $V_P - V_Q$ taking into consideration this charge. Namely supposing that $V_P - V_Q$ is $V(P_1 - Q_1)$ when the polarity of power source cycle is backward to diode D and that $V_P - V_Q$ is $V(P_2 - Q_2)$ when the polarity is forward, voltage $V_Q$ moves as a whole in the direction of charging polarity, though alternately, with progress of charge of condenser $C_1$ in the form of direct current. Moreover since $V_P$ is constant so far as variable resister V.R. is not changed, $V(P_1 - Q_1)$ increases little by little and $V(P_2 - Q_2)$ decreases little by little as shown in FIG. 7.

Additionally by appropriately selecting resister $R_2$, the present invention can adjust charging constant and terminal voltage of element $SSS_T$ for ignition at the time of charging, when, power source polarity is forward to diode D. In FIG. 6(i), $V(P_1 - Q_1)$ reaches breakover of element $SSS_T$ for ignition every two cycles. The figure shows that owing to breakover of element $SSS_T$ for ignition, when element $SSS_M$ for main circuit becomes continuity, voltages $V_P$ and $V_Q$ becomes zero so that $V_P - V_Q$ also becomes zero. When element $SSS_M$ for main circuit becomes discontinuity after a half cycle, voltages $V_P$ and $V_Q$ are again applied and at the same time voltage $V_Q$ begins to move little by little to the polarity side charged in the form of direct current. And when charging quantity of condenser $C_1$ and voltage $V_P$ of resister $R_1$ are reduced by the increase of resistance value of variable register V.R., the phase of breakover of element $SSS_T$ for ignition goes back, and instantaneous value of cycle of one side reaches breakover at each several cycles. This enables to put input termnial voltage of motor under spacing wave control in various conditions as shown in FIG. 4(c)–(a). On the contrary when the resistance value of variable resistor V.R is further reduced, input terminal voltage can be changed into the condition of FIG. 6(ii), and phase of breakover of element $SSS_T$ for ignition advances so as to make phase control as shown in FIG. 4(d)–(e). When the resistance value of the resister is further reduced, a special spacing wave control as shown in FIG. 4(f) can be made. In this case, the instantaneous value of cycle of one side of terminal voltage of element $SSS_T$ for ignition also reaches breakover value of element $SSS_T$ for ignition at each several cycles as represented by $V(P_2 - Q_2)$ in FIG. 6(ii). When the resistance value of variable resister V.R. is reduced further than the case of said FIG. 4(f), a perfect bilateral wave control can be made as shown in FIG. 4(g) and also phase control can be made. The reason for that the number of cycle for the period until voltage $V(P_2 - Q_2)$ shown in FIG. 4(f)–(g) reaches breakover value of element for ignition is somewhat different from the case of said $V(P_1 - Q_1)$ since all half cycles of one side are already in continuity. However this control of cycle number is also influenced by charge of condenser $C_1$ by diode D and resister $R_2$.

Above-stated control in zone of conditions of FIG. 4(d)–(g) is of course made by variable register V.R but can be automatically made by the condition of load of motor, too. Namely when the condition of current of motor is changed by the variation of load of motor, this change of current of motor actuates the circuit so that terminal voltage of motor may rise automatically, for instance, when load increased. Moreover since the revolution of sewing machine has been speeded up in this zone, there occurs no phenomena of fluctuation of revolution as in the cases of knocking of internal combustion engine. Additionally, this automatical feedback control phenomenon is similar to that of prior publicly known arts.

I claim:

1. A system for controlling the speed of a motor including an alternating power source, a motor having input and output terminals, a main circuit having a symmetrical semiconductor switching element for the main circuit and connected to the power source and the motor, a voltage dividing circuit having a variable resistor and a first resistor and connected in parallel to the main circuit, a circuit having a symmetrical semiconductor switching element for ignition and a first condenser and connected in parallel to the voltage dividing circuit, a diode and a second resistor connected in series and a second condenser respectively connected in parallel to the switching element for ignition, and a pulse transformer having primary and secondary windings, the primary winding of which being connected in series to the second condenser while the secondary winding being connected to the main circuit whereby the first condenser is charged with the alternating voltage developed between the terminals of the switching element for ignition and rendered positively and negatively asymmetrical by the series circuit of diode and second resistor and by the second condenser, and the switching element for ignition is fired by the differential voltage between the alternating voltage developed between the terminals of the first resistor and the asymmetrical voltage developed between the terminals of the first condenser which divides the alternating power source with the variable resistor.

2. A system for controlling the speed of a motor as claimed in claim 1, wherein the resistance value of the second resistor is made smaller than the impedance of the second condenser which is connected to the primary of the pulse transformer so as to make the alternative voltage applied to the first condenser always asymmetrical and to make charging to the first condenser occur at a side of larger voltage of the condenser.

3. A system for controlling the speed of a motor as claimed in claim 2, wherein the second resistor has a resistance value such that the charging time constant of the first condenser and the terminal voltage of the switching element for ignition circuit are regulated.

4. A system for controlling the speed of a motor as claimed in claim 1, wherein the voltage dividing circuit set voltage is regulatable by the variable resistor whereby the charging amount of the first condenser and the voltage of the first resistor are varied to change the ignition phase of the switching element for the ignition circuit causing the input terminal voltage of the motor to be subjected to the space wave control and a phase control.

5. A circuit for controlling the speed of a motor comprising a closed main circuit having an alternating power source, a motor, a symmetrical semiconductor switching element for the main circuit and a secondary winding of a pulse transformer, a circuit having a variable resistor and a first resistor in series, and connected in parallel to the circuit of the power source and the motor, a circuit having a symmetrical semiconductor switching element for ignition and a first condenser in series, and connected in parallel to the first resistor, a circuit having a second condenser and a primary winding of a pulse transformer in series, and connected in parallel to the switching element for ignition, and a circuit having a diode and a second resistor in series, and connected in parallel to the switching element for ignition.

References Cited

UNITED STATES PATENTS

| | | | |
|---|---|---|---|
| 3,177,417 | 4/1965 | Wright | 318—331 |
| 3,293,523 | 12/1966 | Hutson | 318—331 |

ORIS L. RADER, Primary Examiner

T. LANGER, Assistant Examiner

U.S. Cl. X.R.

318—331